United States Patent
Kawasaki et al.

(10) Patent No.: US 11,698,199 B2
(45) Date of Patent: Jul. 11, 2023

(54) WORK HOOD

(71) Applicant: AIREX CO., LTD., Nagoya (JP)

(72) Inventors: Koji Kawasaki, Nagoya (JP); Daisuke Kakuda, Nagoya (JP); Jun Masudome, NNagoya (JP); Takashi Kinbara, Nagoya (JP); Kazuhiko Kitahora, Nagoya (JP); Ken Nagai, Nagoya (JP); Hiroyuki Imai, Nagoya (JP); Takuya Hayashi, Nagoya (JP)

(73) Assignee: AIREX CO., LTD.

( * ) Notice: Subject to any disclaimer, the term of this patent is extended or adjusted under 35 U.S.C. 154(b) by 158 days.

(21) Appl. No.: 17/047,330

(22) PCT Filed: Apr. 23, 2019

(86) PCT No.: PCT/JP2019/017303
§ 371 (c)(1),
(2) Date: Oct. 13, 2020

(87) PCT Pub. No.: WO2019/235093
PCT Pub. Date: Dec. 12, 2019

(65) Prior Publication Data
US 2021/0164672 A1    Jun. 3, 2021

(30) Foreign Application Priority Data
Jun. 8, 2018  (JP) ................. 2018-110247

(51) Int. Cl.
F24F 3/163   (2021.01)
B01L 1/04    (2006.01)
F24F 7/06    (2006.01)

(52) U.S. Cl.
CPC ............... *F24F 3/163* (2021.01); *B01L 1/04* (2013.01); *F24F 7/06* (2013.01)

(58) Field of Classification Search
CPC ............... F24F 3/163; F24F 7/06; B01L 1/04
(Continued)

(56) References Cited

U.S. PATENT DOCUMENTS 3,337,279 A * 8/1967 Reinhardt ............... G21F 3/035
                                                    976/DIG. 339
3,907,389 A * 9/1975 Cox ........................ B01L 1/02
                                                    976/DIG. 363
(Continued)

FOREIGN PATENT DOCUMENTS

JP    2000346418 A    12/2000
JP    2001074883 A     3/2001
(Continued)

*Primary Examiner* — Avinash A Savani
*Assistant Examiner* — Dana K Tighe
(74) *Attorney, Agent, or Firm* — Quarles & Brady LLP; Yakov S. Sidorin (57) ABSTRACT

The present invention provides a work hood that allows for free rotation in a work box to provide a wide work area and easy decontamination of a sealing portion present at the boundary between the work hood and the work box.
A rotation support for rotatably supporting the entire half suit is provided. The rotation support includes a base portion, a rotating portion, a bearing portion, a sealing member, and a communication hole. The base portion is airtightly and annularly provided around an opening, and the rotating portion is provided around the base portion through the bearing portion, with a hem portion of the half suit being fixed to the rotating portion. The sealing member is annularly provided in an annular space formed by the base portion and the rotating portion so as to separate the work box and the external environment. The communication hole is provided so as to lead to the external environmental side from the annular small space side formed by the sealing member together with the base portion, the rotating portion, and the bearing portion, and is connected to a supply means (Continued)

for supplying a decontamination gas and the like to the inside of the small space and to a suction means for sucking clean air and the like from the inside of the small space.

8 Claims, 6 Drawing Sheets

(58) Field of Classification Search
 USPC .......................................................... 454/187
 See application file for complete search history.

(56) References Cited

U.S. PATENT DOCUMENTS

| | | | |
|---|---|---|---|
| 5,257,957 A | | 11/1993 | Diccianni |
| 5,997,399 A | * | 12/1999 | Szatmary ................ F24F 3/163 |
| | | | 454/187 |
| 9,055,799 B2 | * | 6/2015 | Cohn ................... A61G 10/005 |

FOREIGN PATENT DOCUMENTS

| | | |
|---|---|---|
| JP | 2014057922 A | 4/2014 |
| JP | 2017133899 A | 8/2017 |

\* cited by examiner

WORK HOOD

CROSS-REFERENCE TO RELATED APPLICATIONS

This patent application represents the U.S. national stage entry of International Application No. PCT/JP2019/017303, filed on Apr. 23, 2019 and now published as WO 2019/235093, which claims priority from Japanese Patent Application No. 2018-110247 filed on Jun. 8, 2018. The disclosure of each of the above-identified patent documents is incorporated by reference herein.

TECHNICAL FIELD

The present invention relates to a work hood used in environments requiring high air cleanliness for separating a worker from the environment.

BACKGROUND ART

In a work at a manufacturing or research and development stage of pharmaceutical products, environments requiring high air cleanliness such as a clean room and a dust-free room must be prepared. Specifically, workers often fill such pharmaceutical products into a sterile container manually, and potential work environment contamination is prevented by employing a work box operated in a sterile/dust-free state. Conversely, works for handling materials harmful to the human body and the like involve the use of work boxes sealed in operation to protect a worker from a contaminated environment. What is employed in these work boxes for a worker to perform a work is a glove box system using a glove from an outside of the work box or a work hood system using a work hood such as a half suit with the upper body projecting into the work box.

In the glove box system, a wall portion partially composed of a work box is formed of a transparent glass panel, and a worker can perform a work in the work box through a glove held at the transparent wall portion, while visually confirming the inside of the work box from the outside thereof through the transparent wall portion. Nonetheless, the glove box system provides a limited work area, and its fixed glove position restricts the movement of worker's arms, resulting in insufficient workability.

Meanwhile, the work hood system composed of a half suit requires a worker to wear a half suit from the outside of the work box. The worker in the half suit can perform a work with the upper body projecting into the work box, leading to more improved workability than the glove box system.

Illustrative example of the work box for a worker in the half suit to perform a work includes the one proposed in the following patent document 1: an aseptic filling/packaging apparatus including a half suit made of an air-impermeable and flexible material such that the half suit projects into the inside of an aseptic chamber.

Herein, the above half suit, formed of flexible materials such as rubber materials and vinyl chloride resins, provides a significantly improved workability compared to the glove box system. While a work hood formed of any of these flexible materials shows some degree of freedom for a worker to tilt the body forward/backward rightward/leftward, the degree of freedom for body rotation is low and thus further improvement in operating efficiency has been required.

For instance, the following patent document 2 proposes a work hood capable of freely and entirely rotating a half suit in a work box. The work hood is used primarily for manually sorting low-level radioactive waste at nuclear power plants. Thus, a sealing member is disposed at the boundary between a rotary half suit and the work hood to protect a worker from contaminants in the work box.

CITATION LIST

Patent Literature

Patent Document 1: JP-A-11-208623 A
Patent Document 2: JP-A-2001-074883 A

SUMMARY OF THE INVENTION

Technical Problem

Meanwhile, in a work box (mainly an isolator) used in works for filling pharmaceutical products into a sterile container, the inside thereof needs frequent decontamination for sterilization or dust removal to strictly maintain an internal sterile/dust-free environment. Unfortunately, in ordinary decontamination works, a contact portion of a sealing member present at the boundary between a half suit and a work box (a contact portion between a rotary half suit and a bottom wall portion of a work box) can not sufficiently be decontaminated. For this reason, rotary half suits have not traditionally been employed in work boxes in a sterile environment.

The present invention was made in view of the situation to solve the problems, and has an object to provide a work hood that allows for free rotation in a work box to provide a wide work area and easy decontamination of a sealing portion at the boundary between the work hood and the work box.

Solution to the Problem

To solve the aforementioned problem, inventors of the present invention have carried out an extended investigation to find a technique of providing a small space on the external environmental side of a sealing member present at the boundary between a half suit and a work box (on the side of the worker's lower body opposite the work box), and using the small space, a decontamination gas is both discharged to the sealing member and sucked. Based on that technique, the inventors found that the cleanliness of the sealing member can sufficiently be maintained and the object of the present invention can be fulfilled, and the present invention was accomplished.

Specifically, a work hood according to the present invention is, according to description in claim 1, a work hood (20, 120, 220, 320) including a hollow half suit (21, 121, 221, 321), the work hood being connected around an opening (13a) formed at part of a work box (12) and projecting into the inside of the work box, characterized in that a connecting portion between the periphery of the opening and a hem portion (21a, 121a, 221a, 321a) of the half suit is provided with an annular rotation support (30, 130, 230, 330) for rotatably supporting the entire half suit, the rotation support includes a base portion (31, 131, 231, 331), a rotating portion (32, 132, 232, 332), a bearing portion (33, 133, 233, 333), a sealing member (34, 134, 234, 334), and a communication hole (35, 135, 235, 335), the base portion is airtightly and annularly provided around the opening, the rotating portion is rotatably and annularly provided so as to airtightly fix the hem portion of the half suit over the whole periphery and be opposite the base portion through the bearing portion around the base portion, the sealing member is annularly provided over the whole periphery of the rotation support in an annular gap (38, 138, 238, 338) formed by the base portion and the rotating portion so as to separate the work box and the external environment, the communication hole is provided in an annular small space (39, 139, 239, 339) formed by the sealing member together with the base portion, the rotating portion, and the bearing portion so as to lead to the external environmental side from the small space side, and a supply means (41) for supplying clean air, a decontamination gas or a decontamination mist to the inside of the small space and/or a suction means (42) for sucking clean air, a decontamination gas or a decontamination mist from the inside of the small space are connected to the opening of the communication hole.

Moreover, the present invention is, according to description in claim 2, the work hood according to claim 1, characterized in that the bearing portion includes a large bearing having an outer diameter corresponding to the periphery of the opening, and the rotating portion is rotated opposite the base portion by fixing an inner race (33*a*, 133*a*, 233*a*) of the bearing to the outer periphery of the base portion and an outer race (33*b*, 133*b*, 233*b*) of the bearing to the inner periphery of the rotating portion such that a rotating shaft of the large bearing is orthogonal to an opening surface of the opening.

Furthermore, the present invention is, according to description in claim 3, the work hood according to claim 1, characterized in that the bearing portion includes a plurality of small bearings (333*a*), the plurality of small bearings is annularly arranged over the outer periphery of the base portion and the respective shaft portions (333*c*) are provided toward the center of the ring, and the rotating portion is rotated opposite the base portion by allowing the annular periphery of the rotating portion to come into contact with the outer race (333*b*) of each of the small bearings.

Moreover, the present invention is, according to description in claim 4, the work hood according to any one of claims 1 to 3, characterized in that the sealing member (434) is projected onto either of wall surfaces (431*c*, 432*c*) of the base portion and the rotating portion forming the annular gap, and includes control mechanisms (434*a*, 434*b*, 434*c*) for changing the height of a projecting portion of the sealing member, and the control mechanisms are activated to allow a projection end of the sealing member to move such that the projection end comes into contact with the wall surface of the rotating portion or the base portion in opposition thereto.

Furthermore, the present invention is, according to description in claim 5, the work hood according to any one of claims 1 to 4, including a drive unit (50) for rotating opposite the base portion the rotating portion fixing the half suit, the drive unit including:

a stationary disk portion (51) having a diameter engageable on the annular inner periphery of the base portion;

a rotary disk portion (52) having a diameter engageable on the annular inner periphery of the rotating portion;

a support shaft portion (53) passing through the central axis with the stationary disk portion and the rotary disk portion;

a drive portion (54) for rotating the rotary disk portion opposite the stationary disk portion concentrically; and a compressed air supply portion (55) for expanding the half suit, characterized in that the stationary disk portion includes a first annular expansion packing (51*b*) on the outer periphery of the base portion such that the discoid outer periphery comes into contact with the annular inner periphery of the base portion to be fixed, the rotary disk portion includes a second annular expansion packing (52*b*) on the outer periphery of the rotating portion such that the discoid outer periphery comes into contact with the annular inner periphery of the rotating portion to be fixed, the support shaft portion is composed of double pipes, with a first pipe (53*a*) supporting the stationary disk portion and a second pipe supporting the rotary disk portion, and the second pipe (53*b*) operated with the drive portion to rotate the rotary disk portion, and the compressed air supply portion supplies compressed air to the inside of the half suit hermetically sealed by the rotating portion and the rotary disk portion through a supply pipe (55*a*) passing through the support shaft portion from a compressed air supply source in the external environment.

Advantageous Effects of the Invention

According to the above configuration, the work hood according to the present invention is provided with an annular rotation support at a connecting portion between the periphery of an opening formed at part of a work box and a hem portion of a half suit. The rotation support includes a base portion, a rotating portion, a bearing portion, a sealing member, and a communication hole. The base portion is airtightly and annularly provided around the opening. Meanwhile, the rotating portion is rotatably and annularly provided through the bearing portion around the base portion. Also, in the rotating portion, the hem portion of the half suit is airtightly fixed over the whole periphery. These configurations allow the rotation support to rotatably support the entire half suit, resulting in a wider work area for a worker in the half suit.

The sealing member is annularly provided over the whole periphery of the rotation support in an annular gap formed by the base portion and the rotating portion so as to separate the work box and the external environment. The communication hole is provided in an annular small space formed by the sealing member together with the base portion, the rotating portion, and the bearing portion so as to lead to the external environmental side from the small space side. A supply means for supplying clean air, a decontamination gas or a decontamination mist to the inside of the small space can be connected to the opening of the communication hole. Accordingly, in decontamination works, while a decontamination gas or a decontamination mist can be supplied not only to a work box, but also to a small space to achieve decontamination of the sealing member both from the work box side and the external environmental side. Therefore, the sealing member present at the boundary between the work hood and the work box can readily and completely be decontaminated.

Also, to the opening of the communication hole can be connected a suction means for sucking clean air, a decontamination gas or a decontamination mist from the inside of the small space. Accordingly, in decontamination works, a decontamination gas or a decontamination mist can readily be removed or aerated. Therefore, the sealing member present at the boundary between the work hood and the work box can readily and completely be decontaminated. Furthermore, even when the work box is operated in a sterile state, the suction means can always suck clean air in the work box through the sealing member and the small space, thereby favorably maintaining clean environment inside the work box.

Moreover, according to the above configuration, the bearing portion of the rotation support may include a large bearing having a diameter corresponding to the periphery of the opening. In this case, an inner race of the bearing is fixed to the outer periphery of the base portion and the outer race of the bearing is fixed to inner periphery of the rotating portion such that a rotating shaft of the large bearing is orthogonal to an opening surface of the opening. Accordingly, the rotating portion can be rotated opposite the base portion. Therefore, the rotation support can rotatably support the entire half suit, resulting in a wider work area for a worker in the half suit.

Additionally, according to the above configuration, the bearing portion of the rotation support may include a plurality of small bearings. In this case, the plurality of small bearings is annularly arranged over the outer periphery of the base portion, the respective shaft portions are provided toward the center of the ring, and the annular periphery of the rotating portion comes into contact with the outer race of each of the small bearings. Accordingly, the rotating portion can be rotated opposite the base portion. Therefore, the rotation support can rotatably support the entire half suit, resulting in a wider work area for a worker in the half suit.

Moreover, according to the above configuration, the sealing member provided in an annular gap formed by the base portion and the rotating portion is projected onto either of wall surfaces of the base portion and the rotating portion. The sealing member may include control mechanisms for changing the height of a projecting portion of the sealing member. The control mechanisms are activated to allow a projection end of the sealing member to move such that the projection end comes into contact with the wall surface of the rotating portion or the base portion in opposition thereto by changing the height of the sealing member.

In cases where the projection end of the sealing member comes into contact with the wall surface in opposition thereto, the annular gap formed by the base portion and the rotating portion can airtightly be separated into the work box side and the external environmental side. Accordingly, the clean environment inside the work box can favorably be maintained. Meanwhile, in cases where the gap is slightly left without allowing the projection end of the sealing member to come into contact with the wall surface in opposition thereto, the rotating portion can readily be rotated opposite the base portion, and the sealing member present at the boundary between the work hood and the work box can readily and completely be decontaminated.

In addition, according to the above configuration, the work hood according to the present invention may include a drive unit for rotating opposite the base portion the rotating portion fixing the half suit. The drive unit includes a stationary disk portion, a rotary disk portion, a support shaft portion, a drive portion, and a compressed air supply portion. The stationary disk portion has a diameter engageable on the annular inner periphery of the base portion, and includes a first annular expansion packing on the outer periphery of the base portion such that the discoid outer periphery comes into contact with the annular inner periphery of the base portion to be fixed. The rotary disk portion has a diameter engageable on the annular inner periphery of the rotating portion, and includes a second annular expansion packing on the outer periphery of the rotating portion such that the discoid outer periphery comes into contact with the annular inner periphery of the rotating portion to be fixed.

The support shaft portion is composed of double pipes passing through the central axis of the stationary disk portion and the rotary disk portion, with a first pipe supporting the stationary disk portion and a second pipe supporting the rotary disk portion. Also, the second pipe is operated with the drive portion to rotate the rotary disk portion opposite the stationary disk portion coaxially. The compressed air supply portion supplies compressed air to the inside of the half suit hermetically sealed by the rotating portion and the rotary disk portion through a supply pipe passing through the support shaft portion from a compressed air supply source in the external environment to expand the half suit.

Accordingly, in decontamination works, clean air, a decontamination gas or a decontamination mist can thoroughly be delivered to an annular small space formed by the sealing member together with the base portion, the rotating portion, and the bearing portion. Also, the sealing member present at the boundary between the work hood and the work box can be decontaminated in rotation. Therefore, the sealing member can readily and completely be decontaminated.

The reference letters in parenthesis for each of the above means correspond to the specific means described in each of the following embodiments.

DETAILED DESCRIPTION

A work hood according to the present invention will be described with reference to each embodiment. The present invention is not restricted to each of the following embodiments.

First Embodiment

Figure 1:
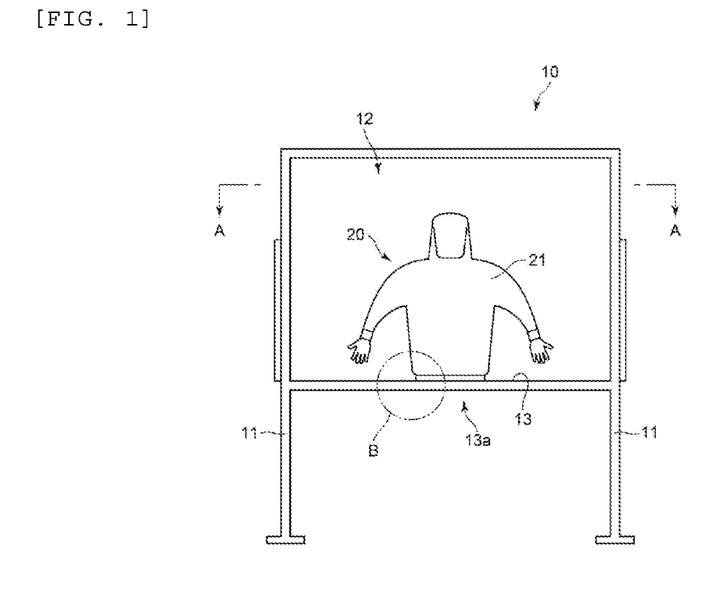
FIG. 1 is a schematic cross-sectional view showing an isolator including a work hood viewed from the front.
Figure 2:
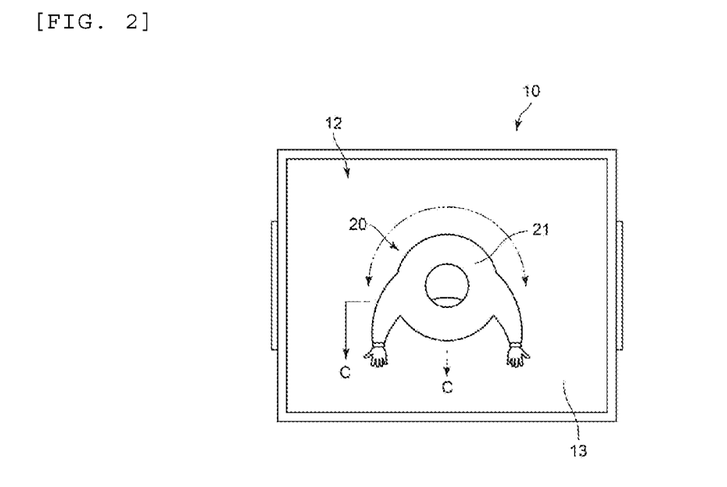
FIG. 2 is a schematic cross-sectional view (taken along the line A-A of FIG. 1) showing the isolator in FIG. 1 viewed from the top.

A first embodiment of the work hood according to the present invention will be described with reference to the drawings. FIG. 1 is a schematic cross-sectional view showing an isolator including a work hood viewed from the front. FIG. 2 is a schematic cross-sectional view (taken along the line A-A of FIG. 1) showing the isolator viewed from the top. In FIGS. 1 and 2, an isolator 10 is composed of leg portions 11 placed on the floor, a work box (chamber) 12 placed on the leg portions 11, and a work hood 20 including a hollow half suit 21 connected at an circular opening 13a formed at a bottom wall portion 13 inside the chamber 12 and projecting into the inside of the chamber 12. In FIG. 2, the work hood 20 is rotatable horizontally at any angle including 360°.

Figure 3:
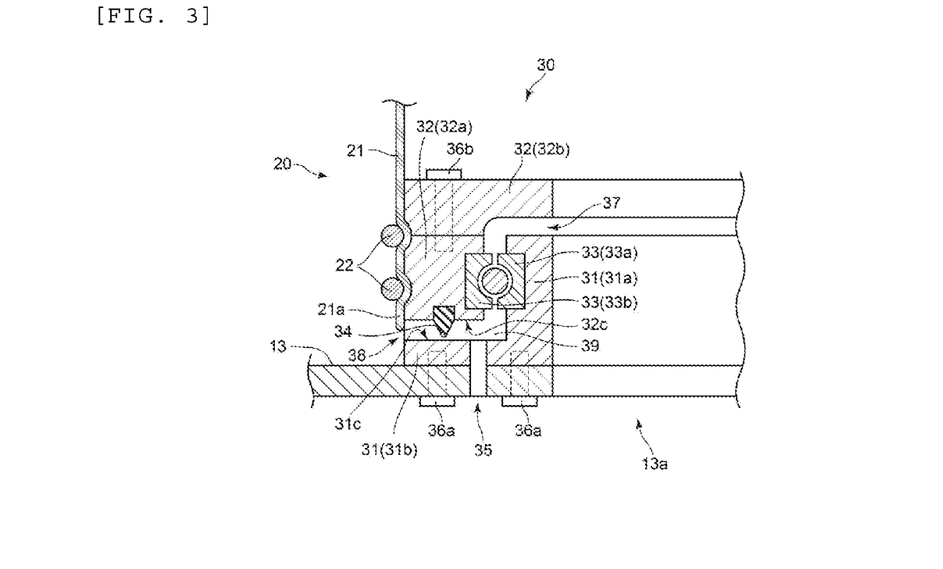
FIG. 3 is a cross-sectional view (taken along the line C-C of FIG. 2 at Part B in FIG. 1) showing the configuration of a rotation support included in a work hood in a first embodiment.

Subsequently, the configuration of a rotation support for allowing the work hood to rotate will be described. FIG. 3 is a cross-sectional view (taken along the line C-C of FIG. 2 at Part B in FIG. 1) showing the configuration of a rotation support included in the work hood 20. In FIG. 3, the work hood 20 is connected around the circular opening 13a formed at the bottom wall portion 13 inside the chamber 12 by an annular rotation support 30. The rotation support 30 includes a base portion 31, a rotating portion 32, a bearing portion 33, a sealing member 34, and a communication hole 35.

The base portion 31 is an annular structure including an L-shaped section composed of a cylindrical portion 31a and an annular plate portion 31b projecting into the outside in the normal direction from an end of the cylindrical portion. The annular plate portion 31b is circular on the inner periphery and airtightly fixed to the bottom wall portion 13 of the chamber 12 with bolts 36a over the whole periphery such that the inner periphery of the annular plate portion overlaps the inner periphery of the circular opening 13a of the chamber 12. The inner periphery portion of the cylindrical portion 31a forms an opening of the work hood 20 into which a worker inserts the upper body. Meanwhile, an inner race 33a of the bearing portion 33 is fixed to the outer periphery of the cylindrical portion 31a. In the first embodiment, a large ball bearing constitutes the bearing portion 33.

The rotating portion 32 is an annular structure including an inverted L-shaped section composed of a cylindrical portion 32a and an annular plate portion 32b projecting into the inside in the normal direction from an end of the cylindrical portion. The cylindrical portion 32a is placed outside the cylindrical portion 31a of the base portion 31 so as to be coaxial therewith, and an outer race 33b of the bearing portion 33 is fixed to the inner periphery of the cylindrical portion 32a. Meanwhile, the annular plate portion 32b is circular on the inner periphery and airtightly fixed to an upper surface of the cylindrical portion 32a with a bolt 36b over the whole periphery such that the inner periphery 36b of the annular plate portion overlaps the inner periphery of the cylindrical portion 31a of the base portion 31. A base end portion 21a of the half suit 21 (see FIG. 1) formed of a flexible material is airtightly fixed to an outer peripheral side surface of the rotating portion 32 (an outer peripheral side surface of the rotating portion 32) configured by the cylindrical portion 32a and the annular plate portion 32b by two O-rings 22.

Thus, in this first embodiment, the base portion 31 and the rotating portion 32 of the rotation support 30 are fixed through the bearing portion 33 (a large ball bearing). Accordingly, in the rotation support 30, the rotating portion 32 fixing the half suit 21 can be rotatable at any angle including 360° opposite the base portion 31 fixed to the bottom wall portion 13 of the chamber 12.

Herein, the large ball bearing that constitutes the bearing portion 33 may be airtight or non-airtight. In cases where a non-airtight large ball bearing is used, a packing may be used in an annular gap 37 (see FIG. 3) between the cylindrical portion 31a of the base portion 31 and the annular plate portion 32b of the rotating portion 32. In this first embodiment, the bearing portion 33 used is an airtight large ball bearing.

The sealing member (lip seal) 34 is annularly projected on a lower end surface 32c of the cylindrical portion 32a in an annular gap 38 formed by the lower end surface 32c of the cylindrical portion 32a of the rotating portion 32 and the upper surface 31c of the annular plate portion 31b of the base portion 31. The lip seal 34 is formed of an elastic body such as synthetic rubber. The tip of the lip seal 34 may slightly come into contact with the upper surface 31c of the annular plate portion 31b, and more preferably, may have a slight gap. Accordingly, a decontamination gas is readily supplied to the tip of the lip seal 34, thereby ensuring a decontamination effect at the sealing portion.

In FIG. 3, the lip seal 34 forms an annular small space 39 surrounded by the base portion 31, the rotating 32, and the bearing portion 33 (large ball bearing). A communication hole 35 for leading to the external environment is provided from the small space 39. As to the communication hole 35, only one hole may be provided through the small space 39, or a plurality thereof may be provided annularly. The direction of the small space 39 formed may be any direction such as the vertical or horizontal direction as long as the space leads to the external environment. In this first embodiment, one communication hole 35 is provided in the vertical direction. The communication hole 35 is connected to a decontamination gas supply unit, a compressed air supply unit, and a vacuum suction unit disposed in the external environment through pipes (see below).

Herein, works in a sterile environment inside the chamber 12 and decontamination works will be described. In this first embodiment, the rotatable work hood 20 is disposed inside the chamber 12. Consequently, the configuration of the rotating portion of the work hood 20, particularly the lip seal 34 and the small space 39 are complicated in stricture, thereby requiring regular cleaning and accurate decontamination at these portions.

Figure 4:
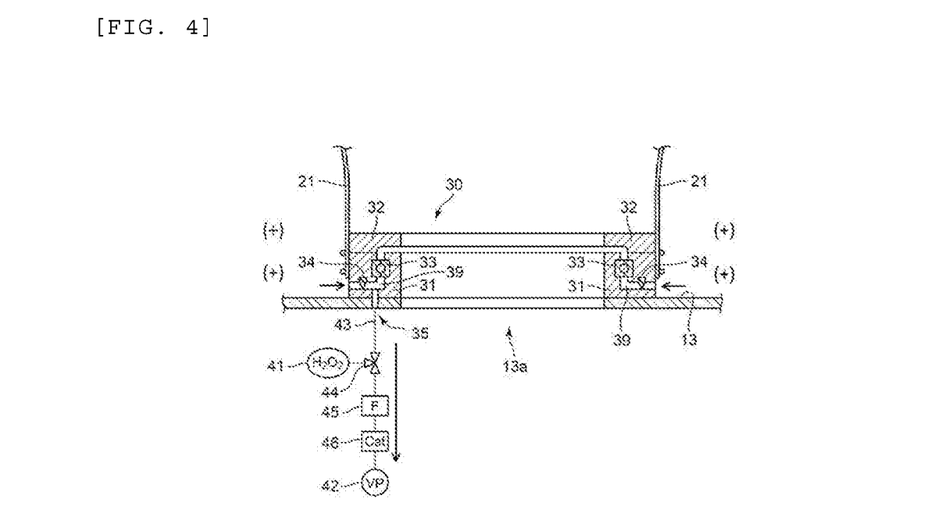
FIG. 4 is a schematic cross-sectional view showing the rotation support of the work hood operated in s sterile environment viewed from the front.

First, works in a sterile environment will be described. FIG. 4 is a schematic cross-sectional view showing the rotation support of the work hood operated in s sterile environment viewed from the front. In FIG. 4, the inside of the decontaminated chamber 12 is maintained at positive pressure compared to the external environment. In FIG. 4, the positive pressure is denoted by a symbol (+). A clean air supply unit to the inside of the chamber 12 and a positive pressure control apparatus are not shown.

In addition, a decontamination gas supply unit 41 and a depressurizing suction device 42 are connected to an opening on the external environmental side of the communication hole 35 via a pipe 43. The pipe 43 is provided with a three-way valve 44 for shifting the communication between the decontamination gas supply unit 41 and the depressurizing suction device 42. In this first embodiment, the decontamination gas used is a hydrogen peroxide gas. A HEPA filter 45 and a catalytic device 46 for decomposing hydrogen peroxide are provided between the depressurizing suction device 42 and the three-way valve 44 in the pipe 43.

The effect of the communication hole 35 thus piped will be described. During the operation in a sterile environment, the three-way valve 44 is shifted to communicate the communication hole 35 and the depressurizing suction device 42 through the pipe 43. By operating the depressurizing suction device 42, the clean air inside the chamber 12 passes through the gap between the base portion 31 and the rotating portion 32 of the rotation support 30 to be sucked from the pipe 43 to the depressurizing suction device 42 through a gap of the lip seal 34 and the small space 39 (the direction indicated by an arrow). Meanwhile, the positive pressure inside the chamber 12 is controlled by a clean air supply unit and a positive pressure control apparatus (both not shown). Accordingly, even when a worker (not shown) performs a work by rotating the work hood 20, the sterile environment inside the chamber 12 is maintained.

Figure 5:
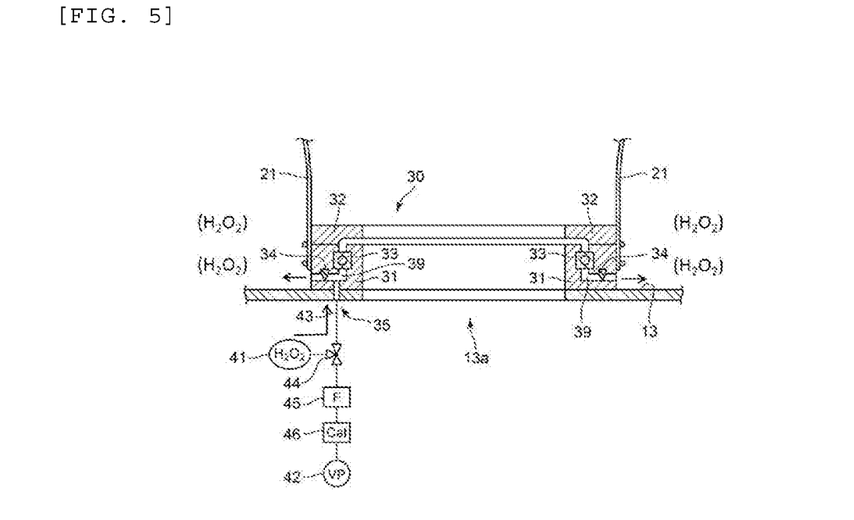
FIG. 5 is a schematic cross-sectional view showing the rotation support of the work hood during a decontamination work viewed from the front.

Subsequently, decontamination works will be described. FIG. 5 is a schematic cross-sectional view showing the rotation support of the work hood during a decontamination work viewed from the front. In FIG. 5, a decontamination gas (hydrogen peroxide gas) is supplied to the inside of the chamber 12. In FIG. 5, a decontamination gas is denoted by a symbol ($H_2O_2$). A decontamination gas supply unit to the inside of the chamber 12 and a decontamination gas concentration control apparatus are not shown. To the opening on the external environmental side of the communication hole 35 are connected the above decontamination gas supply unit 41, the depressurizing suction device 42, the pipe 43, the three-way valve 44, the HEPA filter 45, and the catalytic device 46.

The effect of the communication hole 35 thus piped will be described. During a decontamination work, the three-way valve 44 is switched to communicate the communication hole 35 and the depressurizing supply unit 41 through the pipe 43. By operating the depressurizing supply unit 41, a decontamination gas ($H_2O_2$) is supplied to the small space 39 and the lip seal 34 from the pipe 43 and the communication hole 35, and passes through a gap between the base portion 31 and the rotating portion 32 of the rotation support 30 through the gap of the lip seal 34 to be introduced to the inside of the chamber 12 (the direction indicated by an arrow). In this first embodiment, the supply pressure in the depressurizing supply unit 41 is controlled so as to be higher than the internal pressure of the chamber 12.

During an aeration after a decontamination work by the decontamination gas ($H_2O_2$), the decontamination gas ($H_2O_2$) inside the chamber 12 is removed and the gas is normalized using clean air by the depressurizing suction device 42 through the same route as the above positive pressure control. In this case, the decontamination gas ($H_2O_2$) sucked is decomposed by the catalytic device 46 in the pipe. Accordingly, the lip seal 34 complicated in structure and the small space 39 are decontaminated with high precision. During an aeration, rather than sucking clean air inside the chamber 12 by the depressurizing suction device 42, the depressurizing supply unit 41 may be replaced with a clean compressed air supply unit (not shown) to supply clean air to the inside of the chamber 12 through the same route as the decontamination work.

Figure 6:
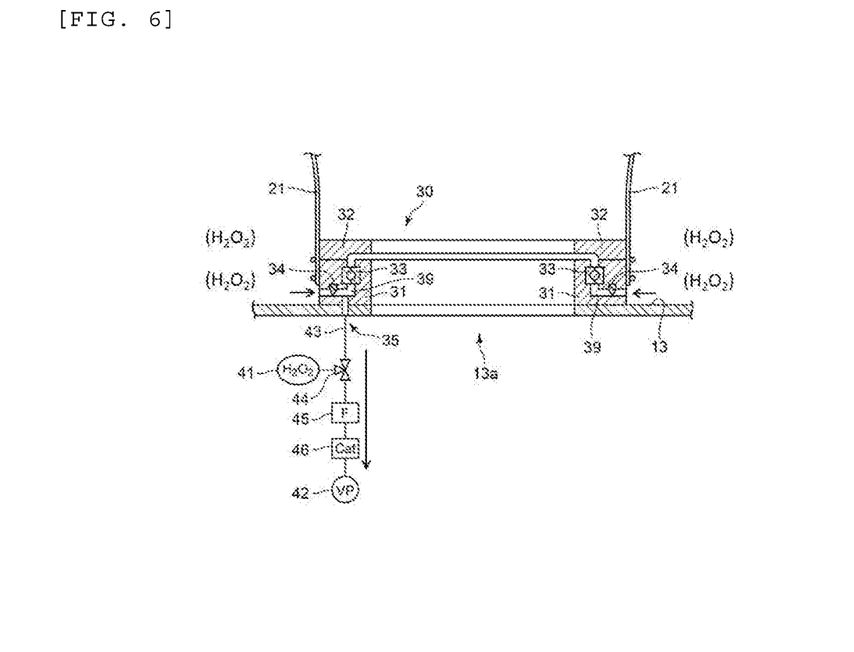
FIG. 6 is a schematic cross-sectional view showing a rotation support of a work hood during a decontamination work that is different from that in FIG. 5 viewed from the front.

Then, a decontamination work different from the above decontamination work will be described. FIG. 6 is a schematic cross-sectional view showing a rotation support of a work hood during a decontamination work that is different from that in FIG. 5 viewed from the front. In FIG. 6, a decontamination gas (hydrogen peroxide gas) is supplied to the inside of the chamber 12. In FIG. 6, a decontamination gas is denoted by a symbol ($H_2O_2$). A decontamination gas supply unit to the chamber 12 and a decontamination gas concentration control apparatus are not shown. To the opening on the external environmental side of the communication hole 35 are connected the above decontamination gas supply unit 41, the depressurizing suction device 42, the pipe 43, the three-way valve 44, the HEPA filter 45, and the catalytic device 46.

The effect of the communication hole 35 thus piped will be described. During a decontamination work, the three-way valve 44 is switched to communicate the communication hole 35 and the depressurizing suction device 42 through the pipe 43. By operating the depressurizing suction device 42, a decontamination gas ($H_2O_2$) inside the chamber 12 passes through a gap between the base portion 31 and the rotating portion 32 of the rotation support 30 to be sucked to the depressurizing suction device 42 from the pipe 43 through the gap at the lip seal 34 and the small spaces 39 (the direction indicated by an arrow). Meanwhile, the concentration of the decontamination gas ($H_2O_2$) inside the chamber 12 is controlled by a decontamination gas supply unit and a decontamination gas concentration control unit (both are not shown).

Herein, the sucked decontamination gas ($H_2O_2$) is decomposed by the catalytic device 46 in the pipe. During an aeration after a decontamination work by the decontamination gas ($H_2O_2$), the decontamination gas ($H_2O_2$) inside the chamber 12 is removed and the gas is normalized using clean air by the depressurizing suction device 42 through the same route as the decontamination work. In this case, the decontamination gas ($H_2O_2$) sucked by the catalytic device 46 in the pipe is also decomposed. Accordingly, the lip seal 34 complicated in structure and the small space 39 are decontaminated with high precision.

Second Embodiment

Figure 7:
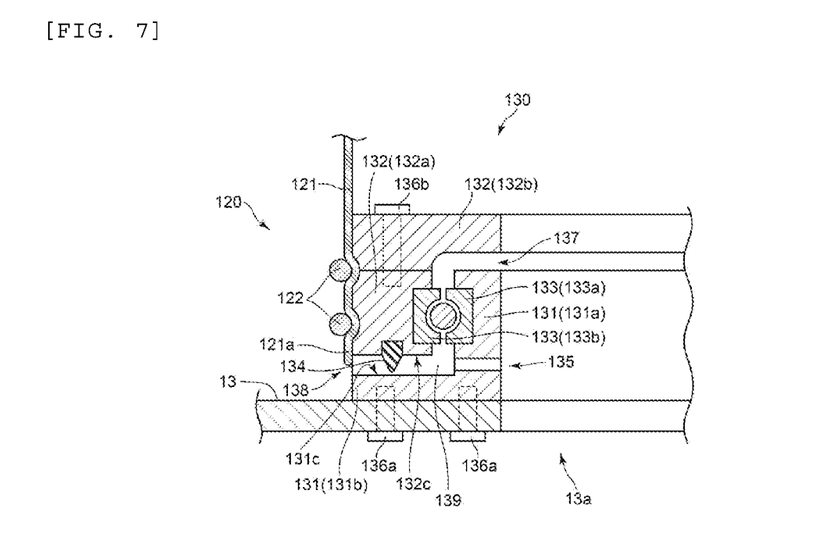
FIG. 7 is a cross-sectional view (taken along the line C-C of FIG. 2 at Part B in FIG. 1) showing the configuration of the rotation support included in the work hood.
Figure 8:
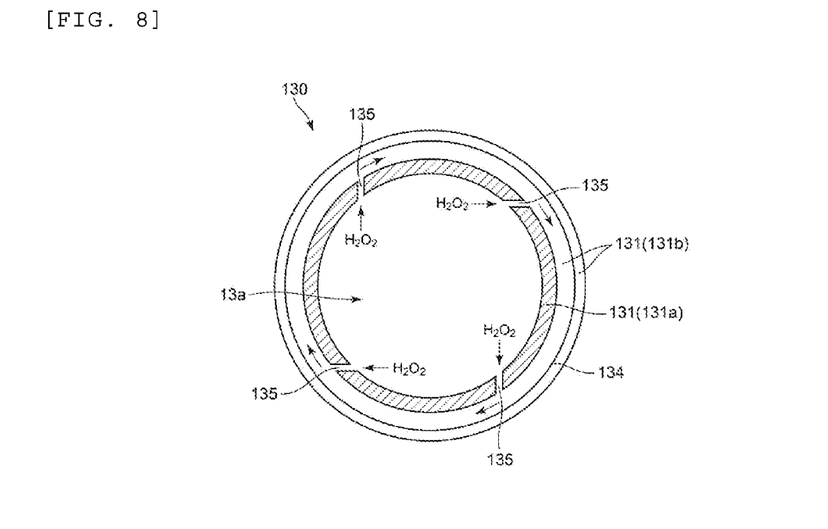
FIG. 8 is a schematic cross-sectional view showing the relationship between a small space and a communication hole in a second embodiment viewed from the top.

A second embodiment of the work hood according to the present invention will be described with reference to the drawings. In this second embodiment, the position and number of communications holes leading to the external environment from a small space are different from those in the first embodiment. FIG. 7 is a cross-sectional view (taken along the line C-C of FIG. 2 at Part B in FIG. 1) showing the configuration of a rotation support included in the work hood. FIG. 8 is a schematic cross-sectional view showing the relationship between a small space and a communication hole in the second embodiment viewed from the top.

In FIG. 7, a work hood 120 is connected around a circular opening 13a formed at a bottom wall portion 13 inside a chamber 12 by an annular rotation support 130. The rotation support 130 includes a base portion 131, a rotation portion 132, a bearing portion 133, a lip seal 134, and a communication hole 135. The configurations of the base portion 131, the rotation portion 132, the bearing portion 133, and the lip seal 134 are identical to those in the above first embodiment.

In FIGS. 7 and 8, the lip seal 134 forms an annular small space 139 surrounded by the base portion 131, the rotation portion 132, and the bearing portion 133 (large ball bearing). The small space 139 is provided with the communication hole 135 leading to the external environment. In this second embodiment, 4 communication holes 135 equally spaced in the annular small space 139 are provided horizontally. Each of the 4 communication holes 135 has a predetermined angle from the annular central direction of the small space 139 (see FIG. 8). The 4 communication holes are each connected to a decontamination gas supply unit, a compressed air supply unit, and a vacuum suction unit disposed in the external environment through a pipe. In this second embodiment, works in a sterile environment inside the chamber 12 and decontamination works are performed in the same manner as in the above first embodiment.

Herein, the reason for providing 4 communications holes 135 horizontally and then providing the same at a predetermined angle from the annular central direction of the small space 139 will be described. In a decontamination work, a decontamination gas ($H_2O_2$) flowing into the small space 139 from the 4 communication holes 135 runs in a constant direction inside the small space 139 (clockwise in FIG. 8). Thus, the decontamination gas flowing into the small space 139 contacts each of the walls of the small space 139 in flow and is introduced to the inside of the chamber 12 through the lip seal 134. Accordingly, the lip seal 134 complicated in structure and the small space 139 are decontaminated with higher precision.

A cylindrical portion 132a of a rotating portion 132 that constitutes the small space 139 may be provided with a plurality of resistance plates (not shown in FIG. 8). By allowing the decontamination gas flowing in a constant direction to hit the small space 139 from the 4 communication holes 135, the rotating portion 132 of the rotation support 130 is slightly rotated opposite the base portion 131. Accordingly, the lip seal 134 complicated in structure and the small space 139 are decontaminated with much higher precision.

Third Embodiment

Figure 9:
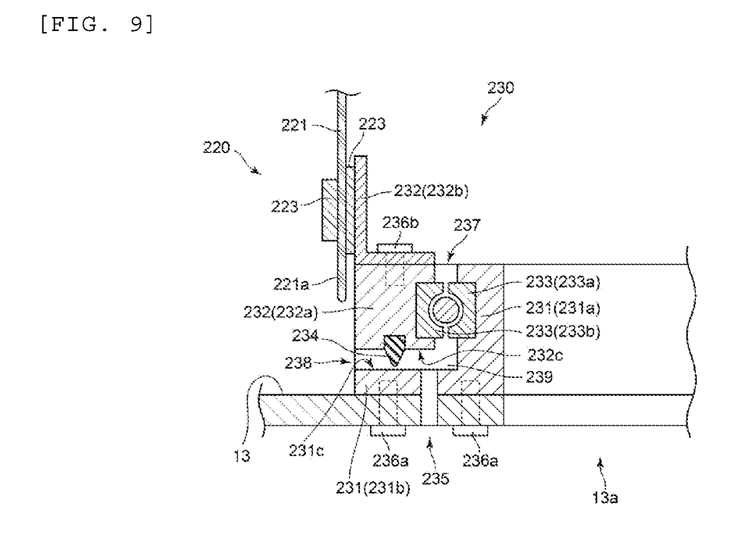
FIG. 9 is a cross-sectional view (taken along the line C-C of FIG. 2 at Part B in FIG. 1) showing the configuration of a rotation support included in a work hood in a third embodiment.

A third embodiment of the work hood according to the present invention will be described with reference to the drawings. In this third embodiment, the configuration of a rotating portion of a rotation support is different from that in the above first embodiment. FIG. 9 is a cross-sectional view (taken along the line C-C of FIG. 2 at Part B in FIG. 1) showing the configuration of a rotation support included in the work hood in the third embodiment.

In FIG. 9, a work hood 220 is connected around a circular opening 13a formed at a bottom wall portion 13 inside a chamber 12 by an annular rotation support 230. The rotation support 230 includes a base portion 231, a rotation portion 232, a bearing portion 233, a lip seal 234, and a communication hole 235. The configurations of the base portion 231, the bearing portion 233, the lip seal 234, and the communication 235 are identical to those in the above first embodiment.

In FIG. 9, the rotating portion 232 is an L-shaped annular structure composed of a circular portion 232a and an annular plate portion 232b projecting upward in the cylindrical axis direction from the outer peripheral end. The circular portion 232a is disposed outside a cylindrical portion 231a of the base portion 231 so as to be coaxial therewith, and an outer race 233b of the bearing portion 233 is fixed to the inner periphery. Meanwhile, the annular plate portion 232b is cylindrical on the outer periphery, and is airtightly fixed to an upper surface of the cylindrical portion 232a with a bolt 236b over the whole periphery so as to overlap the outer periphery of the cylindrical portion 232a. Also, two flat bands 223 are airtightly fixed to inner and outer surfaces of a base end portion 221a of a half suit 221 formed of a flexible material on an outer peripheral side surface of a circular plate portion 232b.

Thus, in this third embodiment, the base portion 231 and the rotating portion 232 of the rotation support 230 are fixed through the bearing portion 233 (large ball bearing). Accordingly, in the rotation support 230, the rotating portion 232 fixing the half suit 221 can be rotatable at any angle including 360° opposite the base portion 231 fixed to the bottom wall portion 13 of the chamber 12.

The communication hole 235 is connected to a decontamination gas supply unit, a compressed air supply unit, and a vacuum suction unit disposed in the external environment through a pipe. In this third embodiment, works in a sterile environment inside the chamber 12 and decontamination works are performed in the same manner as in the above first embodiment. Accordingly, the lip seal 234 complicated in structure and a small space 239 are decontaminated with high precision.

Fourth Embodiment

Figure 10:
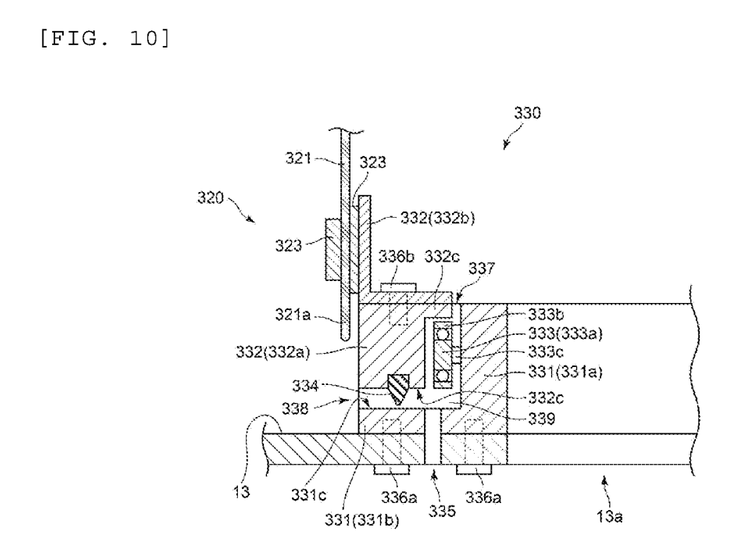
FIG. 10 is a cross-sectional view (taken along the line C-C of FIG. 2 at Part B in FIG. 1) showing the configuration of a rotation support included in a work hood in a fourth embodiment.

A fourth embodiment of the work hood according to the present invention will be described with reference to the drawings. In this fourth embodiment, the configuration of the bearing portion is different from that in the above third embodiment. FIG. 10 is a cross-sectional view (taken along the line C-C of FIG. 2 at Part B in FIG. 1) showing the configuration of a rotation support included in the work hood in the fourth embodiment.

In FIG. 10, a work hood 320 is connected around a circular opening 13a formed at a bottom wall portion 13 inside a chamber 12 by an annular rotation support 330. The rotation support 330 includes a base portion 331, a rotation portion 332, a bearing portion 333, a lip seal 334, and a communication hole 335. The configurations of the base portion 331, the rotation portion 332, the lip seal 334, and the communication 335 are identical to those in the above third embodiment.

In FIG. 10, the base portion 331 is an L-shaped annular structure composed of a cylindrical portion 331a and an annular plate portion 331b projecting outward in the normal direction from one end of the cylindrical portion. The annular plate portion 331b is cylindrical on the inner periphery, and is airtightly fixed to a bottom wall portion 13 of the chamber 12 with bolts 336a over the whole periphery so as to overlap the inner periphery of a circular opening 13a of the chamber 12. An inner peripheral portion of a cylindrical portion 331a forms an opening of the work hood 20 into which a worker inserts the upper body.

Meanwhile, the bearing portion 333 is fixed to the outer periphery of the cylindrical portion 331a. In this fourth embodiment, a plurality of small ball bearings 333a constitutes the bearing portion 333. These small ball bearings 333a are arranged annularly on the outer periphery of the cylindrical portion 331a of the base portion 331 and fixed at equal intervals with each shaft portion 333c toward the center of the ring.

In FIG. 10, the rotating portion 332 is an L-shaped annular structure composed of a cylindrical portion 332a and an annular plate portion 332b projecting upward in the cylindrical axis direction from an outer peripheral end of the cylindrical portion. The cylindrical portion 332a is disposed outside the cylindrical portion 331a of the base portion 331 so as to be coaxial therewith. An eaves portion 332c is formed on an upper portion of the inner periphery of the cylindrical portion 332a over the whole periphery. The eaves portion 332c is disposed so as to come into contact with an upper portion of an outer race 333b of a plurality of small bearings 333a fixed at equal intervals to the outer periphery of the cylindrical portion 331a of the base portion 331.

In this fourth embodiment, since a plurality of small ball bearings 333a is used as the bearing portion 333, a packing may be used in an annular gap 337 between the outer periphery of the cylindrical portion 331a of the base portion 331 and the eaves portion 332c of the upper portion of the inner periphery of the cylindrical portion 332a of the rotating portion 332.

Meanwhile, the annular plate portion 332b is cylindrical on the outer periphery, and is airtightly fixed to an upper surface of the cylindrical portion 332a with a bolt 336b over the whole periphery so as to overlap the outer periphery of the cylindrical portion 332a. Also, two flat bands 323 are airtightly fixed to inner and outer surfaces of a base end portion 21a of a half suit 321 formed of a flexible material on an outer peripheral side surface of a circular plate portion 332b.

Thus, in this fourth embodiment, the base portion 331 and the rotating portion 332 of the rotation support 330 come into contact with each other through the bearing portion 333 (a plurality of small ball bearings 333a). Accordingly, in the rotation support 330, the rotating portion 332 fixing the half suit 321 can be rotatable at any angle including 360° opposite the base portion 331 fixed to the bottom wall portion 13 of the chamber 12.

The communication hole 335 is connected to a decontamination gas supply unit, a compressed air supply unit, and a vacuum suction unit disposed in the external environment through a pipe. In this fourth embodiment, works in a sterile environment inside the chamber 12 and decontamination works are performed in the same manner as in the above first embodiment. Accordingly, the lip seal 334 complicated in structure and a small space 339 are decontaminated with high precision.

Fifth Embodiment

Figure 11:
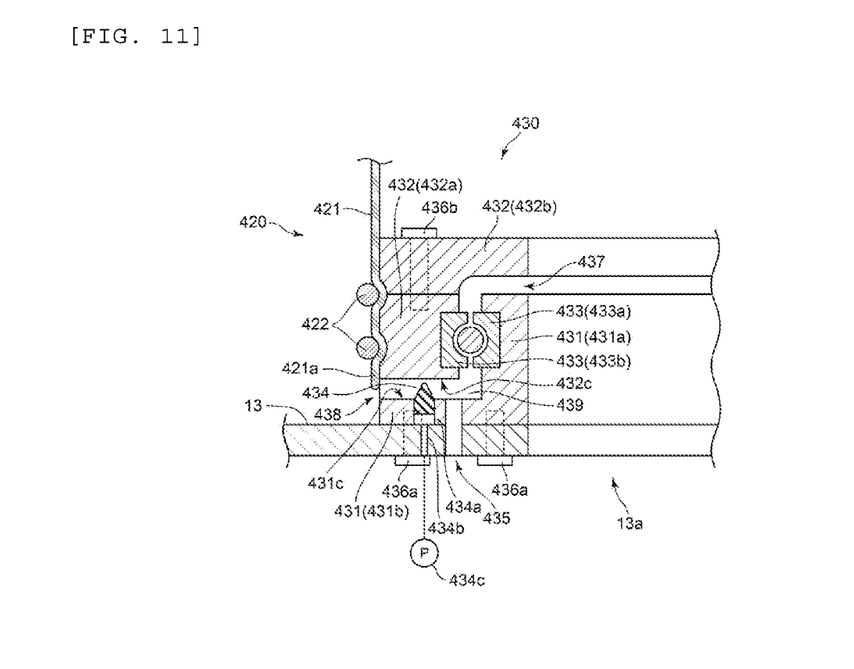
FIG. 11 is a cross-sectional view (taken along the line C-C of FIG. 2 at Part B in FIG. 1) showing the configuration of a rotation support included in a work hood in a fifth embodiment.

A fifth embodiment of the work hood according to the present invention will be described with reference to the drawings. In this fifth embodiment, the projecting position and functions of a sealing member (lip seal) are different from those in the above first embodiment. FIG. 11 is a cross-sectional view (taken along the line C-C of FIG. 2 at Part B in FIG. 1) showing the configuration of a rotation support included in the work hood in the fifth embodiment.

In FIG. 11, a sealing member (lip seal) 434 is annularly projected on an upper surface 31c of an annular plate portion 431b in an annular gap 438 formed by a lower end surface 432c of a cylindrical portion 432a of a rotating portion 432 of a rotation support 430 and the upper surface 431c of an annular plate portion 31b of a base portion 431. The lip seal 434 is formed of an elastic body such as synthetic rubber.

The configurations of the base portion 431, the rotation portion 432, the bearing portion 433, and the communication 435 are identical to those in the above first embodiment.

The lip seal according to this fifth embodiment, as described above, has different functions from the above first embodiment. In function, the lip seal 434 according to this fifth embodiment is configured to change the height of a projecting portion of the lip seal 434 projecting from the upper surface 31c of the annular plate portion 31b. Thus, the lip seal 434 is slidably buried vertically from the annular plate portion 31b, and includes control mechanisms 434a, 434b, 434c for controlling the height of the projecting portion.

The control mechanisms include an air chamber 434a sealed at a base end portion (a portion buried inside the annular plate portion 31b) of the lip seal 434. The air chamber 434a communicates into a pump 434c in the external environment through a pipe 434b. In cases where air is supplied to the air chamber 434a by operating the pump 434c, the air chamber 434a expands to push up the lip seal 434 from the upper surface 31c of the annular plate portion 31b. Meanwhile, in cases where the air is discharged from the air chamber 434a by shifting and operating the pump 434c, the air chamber 434a shrinks to push down the lip seal 434 from the upper surface 31c of the annular plate portion 31b.

Accordingly, the height of the projecting portion of the lip seal 434 can be adjusted depending on each work in a sterile environment inside the chamber 12 or each decontamination work. Specifically, the distance between a projecting tip portion of the lip seal 434 and a wall surface in opposition thereto (the lower end surface 432c of the cylindrical portion 432a of the rotating portion 432) can be controlled, or the projecting tip portion and the wall surface can come into contact with each other.

For example, in cases where a work is performed in a sterile environment inside the chamber 12, the sterile state can readily be maintained and the work hood can readily be rotated by preparing a slight gap between the projecting tip portion of the lip seal 434 and the wall surface or allowing the same to slightly come into contact with each other. Meanwhile, in cases where a decontamination gas is supplied or aerated in a decontamination work, a gap is prepared between the projecting tip portion of the lip seal 434 and the wall surface to allow a decontamination gas or clean air for aeration to pass readily, resulting in ensured decontamination effects at the sealing portion.

In this fifth embodiment, the projecting position of the lip seal 434 is on the upper surface 31c of the annular plate portion 31b of the base portion 431, but it is not restricted thereto, and it may project into the lower end surface 432c of the cylindrical portion 432a of the rotating portion 432 as in the above first embodiment. In this fifth embodiment, the lip seal 434 is moved up and down by operating the control mechanisms 434a, 434b, 434c, but it is not restricted thereto, and an expansion packing may be used as a sealing member by air pressure and the air pressure in the expansion packing may be adjusted to control the distance between the expansion packing and a wall surface in opposition thereto.

Sixth Embodiment

Figure 12:
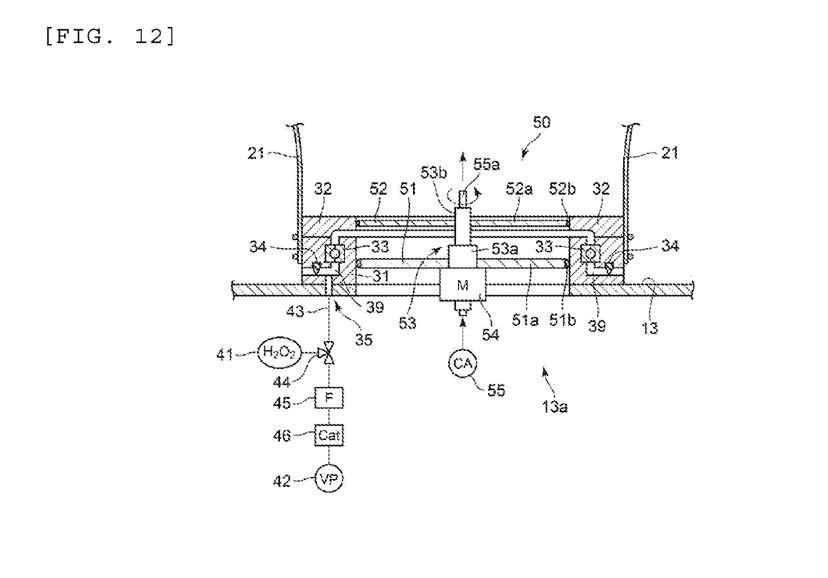
FIG. 12 is a schematic cross-sectional view showing a rotation support of a work hood including a drive unit in a sixth embodiment viewed from the front.

A sixth embodiment of the work hood according to the present invention will be described with reference to the drawings. In this sixth embodiment, in a decontamination work inside a chamber 12, a drive unit for automatically rotating a half suit is provided. The configurations of the portions other than the drive unit are the same as those in the above first embodiment. FIG. 12 is a schematic cross-sectional view showing a rotation support of the work hood including the drive unit in the sixth embodiment viewed from the front.

In FIG. 12, a drive unit 50 comes into contact with an inner peripheral portion of a rotation support 30 provided in a circular opening 13a formed at a bottom wall portion 13 inside the chamber 12 to be fixed. The drive unit 50 includes a stationary disk portion 51, a rotary disk portion 52, a support shaft portion 53, a drive motor 54, and a compressed air supply unit 55.

The stationary disk portion 51 includes a disk 51a having a diameter engageable into an annular inner peripheral surface of a base portion 31 of the rotation support 30 and an annular expansion packing 51b around the outer peripheral surface thereof. In FIG. 12, the expansion packing 51b expands to come into contact with the annular inner peripheral surface of the base portion 31 to be airtightly fixed. The rotary disk portion 52 includes a disk 52a having a diameter engageable into an annular inner peripheral surface of a rotating portion 32 of the rotation support 30 and an annular expansion packing 52b around the outer peripheral surface thereof. In FIG. 12, the expansion packing 52b expands to come into contact with the annular inner peripheral surface of the rotating portion 32 to be airtightly fixed.

The support shaft portion 53 is composed of double pipes 53a, 53b, passing through the axis of center with the stationary disk portion 51 and the rotary disk portion 52 to allow an outer pipe 53a and an inner pipe 53b to support the stationary disk portion 51 and the rotary disk portion 52, respectively. The inner pipe 53b is operated with the drive motor 54 disposed on a lower surface of the stationary disk portion 51 to rotate the rotary disk portion 52 opposite the stationary disk portion 51. In addition, the compressed air supply unit 55 supplies compressed air to the inside of the half suit 21 fixed at the rotary disk portion 52 through a supply pipe 55a passing through the inside of the support shaft portion 53 in the external environment to expand the half suit 21.

Thus, in this sixth embodiment, the drive unit 50 is fixed to the inner periphery of the rotation support 30. Accordingly, the half suit 21 fixed at the rotating portion 32 of the rotation 30 can be rotated opposite the base portion 31 fixed at the bottom wall portion 13 of the chamber 12 by driving the drive motor 54 in an expansion state.

The communication hole 35 is connected to a decontamination gas supply unit, a compressed air supply unit, and a vacuum suction unit disposed in the external environment through a pipe. In this sixth embodiment, a decontamination work inside the chamber is performed in the same manner as in the above first embodiment. Accordingly, a lip seal 34 complicated in structure and a small space 39 are decontaminated with higher precision.

Therefore, each of the above embodiments can provide a work hood that allows for free rotation in a work box to provide a wide work area and easy decontamination of a sealing portion at the boundary between the work hood and the work box.

REFERENCE SIGNS LIST

10 . . . Isolator device, 11 . . . Leg portion, 12 . . . Work box (Chamber), 13 . . . Bottom wall portion, 13a . . . Opening, 20, 120, 220, 320, 420 . . . Work hood, 21, 121, 221, 321, 421 . . . Half suit, 22, 122, 422 . . . O-ring, 223, 323 . . . Flat band, 30, 130, 230, 330, 430 . . . Rotation support, 31, 131, 231, 331, 431 . . . Base portion, 31a, 131a, 231a, 331a, 431a . . . Cylindrical portion, 31b, 131b, 231b, 331b, 431b . . . Annular plate portion, 32, 132, 232, 332, 432 . . . Rotating portion, 32a, 132a, 232a, 332a, 432a . . . Cylindrical portion, 32b, 132b, 232b, 332b, 432b . . . Annular plate portion, 33, 133, 233, 333, 433 . . . Bearing portion, 333a . . . Small bearing, 33a, 133a, 233a, 433a . . . Inner race, 33b, 133b, 233b, 333b, 433b . . . Outer race, 333c . . . Shaft portion, 34, 134, 234, 334, 434 . . . sealing member (lip seal), 434a . . . Air chamber, 434b . . . Pipe, 434c . . . Pump, 35, 135, 235, 335, 435 . . . Communication hole, 36, 136, 236, 336, 436 . . . Bolt, 37, 38, 137, 138, 237, 238, 337, 338, 437, 438 . . . Gap, 39, 139, 239, 339, 439 . . . Small space, 41 . . . Decontamination gas supply unit, 42 . . . Depressurizing suction device, 43 . . . Pipe, 44 . . . Three-way valve, 45 . . . HEPA filter, 46 . . . Catalytic device, 50 . . . Drive unit, 51 . . . Stationary disk portion, 52 . . . Rotary disk portion, 51a, 52a . . . Disk, 51b, 52b . . . Expansion packing, 53 . . . Support shaft portion, 53a . . . Outer pipe, 53b . . . Inner pipe, 54 . . . Drive motor, 55 . . . Compressed air supply unit, 55a . . . Supply pipe.

The invention claimed is:

1. A work hood comprising a hollow half suit,
the work hood being connected around an opening formed at a part of a work box and projecting into an inside of the work box,
wherein:
a connecting portion between a periphery of the opening and a hem portion of the half suit is provided with an annular rotation support configured to rotatably support the entire half suit,
the annular rotation support includes a base portion, a rotating portion, a bearing portion, a sealing member, and a communication hole,
the base portion is airtightly and annularly provided around the opening,
the rotating portion is rotatably and annularly provided so as to airtightly fix the hem portion of the half suit over the whole periphery and be opposite the base portion through the bearing portion around the base portion,
the sealing member is annularly provided over the whole periphery of the rotating support in an annular gap formed by the base portion and the rotating portion so as to separate the work box and an external environment, and
the communication hole is provided in an annular small space formed by the sealing member together with the base portion, the rotating portion, and the bearing portion so as to lead to an external environment side from a small space side,
wherein the bearing portion includes a large bearing having an outer diameter corresponding to the periphery of the opening, and
wherein the rotating portion is rotated opposite the base portion by fixing an inner race of the bearing to an outer periphery of the base portion and an outer race of the bearing to an inner periphery of the rotating portion such that a rotating shaft of a large bearing is orthogonal to an opening surface of the opening, and
a supply means configured to supply clean air, a decontamination gas, or a decontamination mist to an inside of the small space and connected to the opening of the communication hole, and/or
a suction means configured to suck the clean air, the decontamination gas, or the decontamination mist from the inside of the small space and connected to the opening of the communication hole.

2. The work hood according to claim 1, wherein the sealing member is projected onto either of wall surfaces of the base portion and the rotating portion forming the annular gap, and includes control mechanisms configured to change a height of a projecting portion of the sealing member, and the control mechanisms are configured to be activated to allow a projection end of the sealing member to move such that the projection end comes into contact with a wall surface of the rotating portion or the base portion in opposition thereto.

3. The work hood according to claim 1, comprising:
a drive unit configured to rotate the rotating portion fixing the half suit opposite the base portion,
wherein the drive unit includes:
a stationary disk portion having a diameter engageable on an annular inner periphery of the base portion;
a rotary disk portion having a diameter engageable on an annular inner periphery of the rotating portion;
a support shaft portion passing through a central axis with the stationary disk portion and the rotary disk portion;
a drive portion configured to rotate the rotary disk portion opposite the stationary disk portion concentrically; and
a compressed air supply portion configured to expand the half suit,
wherein:
the stationary disk portion includes a first annular expansion packing on the outer periphery of the base portion such that a discoid outer periphery comes into contact with the annular inner periphery of the base portion to be fixed,
the rotary disk portion includes a second annular expansion packing on the outer periphery of the rotating portion such that the discoid outer periphery comes into contact with the annular inner periphery of the rotating portion to be fixed,
the support shaft portion is composed of double pipes, with a first pipe supporting the stationary disk portion and a second pipe supporting the rotary disk portion, and the second pipe operated with the drive portion to rotate the rotary disk portion, and
the compressed air supply portion is configured to supply compressed air to the inside of the half suit hermetically sealed by the rotating portion and the rotary disk portion through a supply pipe passing through the support shaft portion from a compressed air supply source in the external environment.

4. A work hood comprising a hollow half suit,
the work hood being connected around an opening formed at a part of a work box and projecting into an inside of the work box,
wherein:
a connecting portion between a periphery of the opening and a hem portion of the half suit is provided with an annular rotation support configured to rotatably support the entire half suit,
the annular rotation support includes a base portion, a rotating portion, a bearing portion, a sealing member, and a communication hole,
the base portion is airtightly and annularly provided around the opening,
the rotating portion is rotatably and annularly provided so as to airtightly fix the hem portion of the half suit over the whole periphery and be opposite the base portion through the bearing portion around the base portion,
the sealing member is annularly provided over the whole periphery of the rotating support in an annular gap formed by the base portion and the rotating portion so as to separate the work box and an external environment, and
the communication hole is provided in an annular small space formed by the sealing member together with the base portion, the rotating portion, and the bearing portion so as to lead to an external environment side from a small space side,
wherein the bearing portion includes a plurality of small bearings that is annularly arranged over an outer periphery of the base portion and respective shaft portions are provided toward a center of a ring, and
wherein the rotating portion is configured to be rotated opposite the base portion by allowing an annular periphery of the rotating portion to come into contact with a corresponding outer race of each of small bearings of the plurality of small bearings,
and
a supply means configured to supply clean air, a decontamination gas, or a decontamination mist to an inside of the small space and connected to the opening of the communication hole, and/or
a suction means configured to suck the clean air, the decontamination gas, or the decontamination mist from the inside of the small space and connected to the opening of the communication hole.

5. A work hood according to claim 4, wherein:
the sealing member is projected onto either of wall surfaces of the base portion and the rotating portion forming the annular gap, and includes control mechanisms configured to change a height of a projecting portion of the sealing member, and the control mechanisms are configured to be activated to allow a projection end of the sealing member to move such that the projection end comes into contact with a wall surface of the rotating portion or the base portion in opposition thereto.

6. The work hood according to claim 4, comprising:
a drive unit configured to rotate the rotating portion fixing the half suit opposite the base portion,
wherein the drive unit includes:
a stationary disk portion having a diameter engageable on an annular inner periphery of the base portion;
a rotary disk portion having a diameter engageable on an annular inner periphery of the rotating portion;
a support shaft portion passing through a central axis with the stationary disk portion and the rotary disk portion;
a drive portion configured to rotate the rotary disk portion opposite the stationary disk portion concentrically; and
a compressed air supply portion configured to expand the half suit,
wherein:
the stationary disk portion includes a first annular expansion packing on the outer periphery of the base portion such that a discoid outer periphery comes into contact with the annular inner periphery of the base portion to be fixed,
the rotary disk portion includes a second annular expansion packing on the outer periphery of the rotating portion such that the discoid outer periphery comes into contact with the annular inner periphery of the rotating portion to be fixed, the support shaft portion is composed of double pipes, with a first pipe supporting the stationary disk portion and a second pipe supporting the rotary disk portion, and the second pipe operated with the drive portion to rotate the rotary disk portion, and the compressed air supply portion is configured to supply compressed air to the inside of the half suit hermetically sealed by the rotating portion and the rotary disk portion through a supply pipe passing through the support shaft portion from a compressed air supply source in the external environment.

7. A work hood comprising a hollow half suit,
the work hood being connected around an opening formed at a part of a work box and projecting into an inside of the work box,
wherein:
  a connecting portion between a periphery of the opening and a hem portion of the half suit is provided with an annular rotation support configured to rotatably support the entire half suit,
  the annular rotation support includes a base portion, a rotating portion, a bearing portion, a sealing member, and a communication hole,
  the base portion is airtightly and annularly provided around the opening,
  the rotating portion is rotatably and annularly provided so as to airtightly fix the hem portion of the half suit over the whole periphery and be opposite the base portion through the bearing portion around the base portion,
  the sealing member is annularly provided over the whole periphery of the rotating support in an annular gap formed by the base portion and the rotating portion so as to separate the work box and an external environment, and
  the communication hole is provided in an annular small space formed by the sealing member together with the base portion, the rotating portion, and the bearing portion so as to lead to an external environment side from a small space side,
and
a supply means configured to supply clean air, a decontamination gas, or a decontamination mist to an inside of the small space and connected to the opening of the communication hole, and/or
a suction means configured to suck the clean air, the decontamination gas, or the decontamination mist from the inside of the small space and connected to the opening of the communication hole, wherein the sealing member is projected onto either of wall surfaces of the base portion and the rotating portion forming the annular gap, and includes control mechanisms configured to change a height of a projecting portion of the sealing member, and wherein the control mechanisms are configured to be activated to allow a projection end of the sealing member to move such that the projection end comes into contact with a wall surface of the rotating portion or the base portion in opposition thereto.

8. The work hood according to claim 7, comprising:
a drive unit configured to rotate the rotating portion fixing the half suit opposite the base portion,
wherein the drive unit includes:
a stationary disk portion having a diameter engageable on an annular inner periphery of the base portion;
a rotary disk portion having a diameter engageable on an annular inner periphery of the rotating portion;
a support shaft portion passing through a central axis with the stationary disk portion and the rotary disk portion;
a drive portion configured to rotate the rotary disk portion opposite the stationary disk portion concentrically; and
a compressed air supply portion configured to expand the half suit,
wherein:
the stationary disk portion includes a first annular expansion packing on the outer periphery of the base portion such that a discoid outer periphery comes into contact with the annular inner periphery of the base portion to be fixed,
the rotary disk portion includes a second annular expansion packing on the outer periphery of the rotating portion such that the discoid outer periphery comes into contact with the annular inner periphery of the rotating portion to be fixed,
the support shaft portion is composed of double pipes, with a first pipe supporting the stationary disk portion and a second pipe supporting the rotary disk portion, and the second pipe operated with the drive portion to rotate the rotary disk portion, and
the compressed air supply portion is configured to supply compressed air to the inside of the half suit hermetically sealed by the rotating portion and the rotary disk portion through a supply pipe passing through the support shaft portion from a compressed air supply source in the external environment.

* * * * *